United States Patent [19]

Montheil

[11] Patent Number: 4,811,020

[45] Date of Patent: Mar. 7, 1989

[54] RADAR PROTECTED AGAINST RAIN CLUTTER AND METHOD FOR PROTECTING A RADAR AGAINST RAIN CLUTTER

[75] Inventor: Jean C. Montheil, Fontenay Sous Bois, France

[73] Assignee: Thomson-CSF, Paris, France

[21] Appl. No.: 42,827

[22] Filed: Apr. 27, 1987

[30] Foreign Application Priority Data

Apr. 30, 1986 [FR] France ................... 86 06328

[51] Int. Cl.⁴ .................................. G01S 7/36
[52] U.S. Cl. ...................... 342/159; 342/26; 342/149; 342/188; 342/365
[58] Field of Search ............ 342/26, 159, 149, 188, 342/361, 363, 365, 353, 362, 364; 455/60, 63

[56] References Cited

U.S. PATENT DOCUMENTS

| | | | |
|---|---|---|---|
| 2,851,681 | 9/1958 | Cohn | 342/188 |
| 3,209,355 | 9/1965 | Livingston | 342/362 |
| 3,540,045 | 11/1970 | Taylor | 342/82 |
| 3,568,190 | 3/1971 | Wong | 342/149 X |
| 3,614,787 | 10/1971 | Hart | 342/365 X |
| 3,849,780 | 11/1974 | Dynan | 342/92 |
| 3,883,872 | 5/1975 | Fletcher et al. | 342/363 |
| 3,893,117 | 7/1975 | Nirasawa et al. | 342/159 |
| 3,918,055 | 11/1975 | Shimizo et al. | 342/159 |
| 3,918,059 | 11/1975 | Adrian | 342/16 |
| 4,053,882 | 10/1977 | Van Etten | 342/188 |
| 4,106,015 | 8/1978 | Beguin et al. | 342/89 |
| 4,231,037 | 10/1980 | Long | 342/149 |
| 4,329,687 | 5/1982 | Kloevekorn et al. | 342/188 X |

FOREIGN PATENT DOCUMENTS 0162258 4/1985 European Pat. Off. .
1804896 9/1969 Fed. Rep. of Germany .

Primary Examiner—Theodore M. Blum
Assistant Examiner—Bernarr Earl Gregory
Attorney, Agent, or Firm—Oblon, Fisher, Spivak, McClelland & Maier

[57] ABSTRACT

The radar is designed to identify and then eliminate rain clutter signals. For this, the radar works in circular polarization with alternately identical and opposite polarization directions at transmission and reception, from one recurrence to the next one. The signals are identified by a comparator which compares the sigma video signals relating to the same distance quanta for two successive recurrences, the identifying criterion being a major difference in the level of the signals compared, for rain clutter signals, and little difference for useful echo signals. A switch controlled by the comparator eliminates the parasite signals.

5 Claims, 2 Drawing Sheets

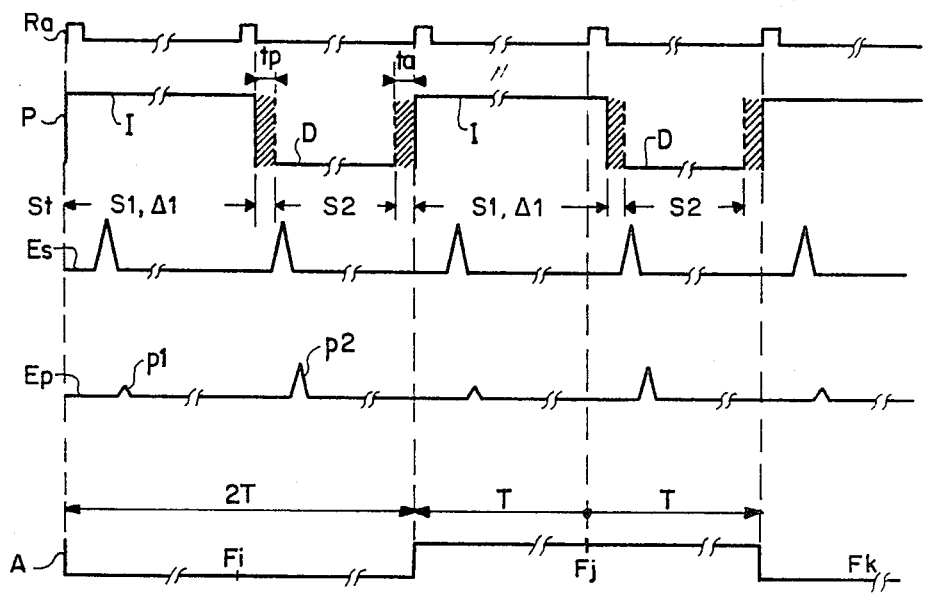
FIG_1
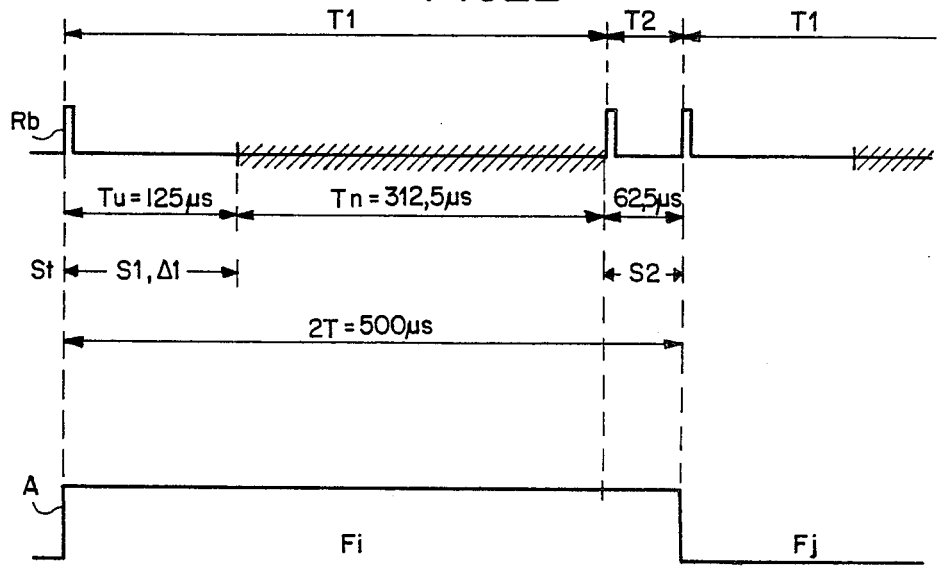
FIG_2

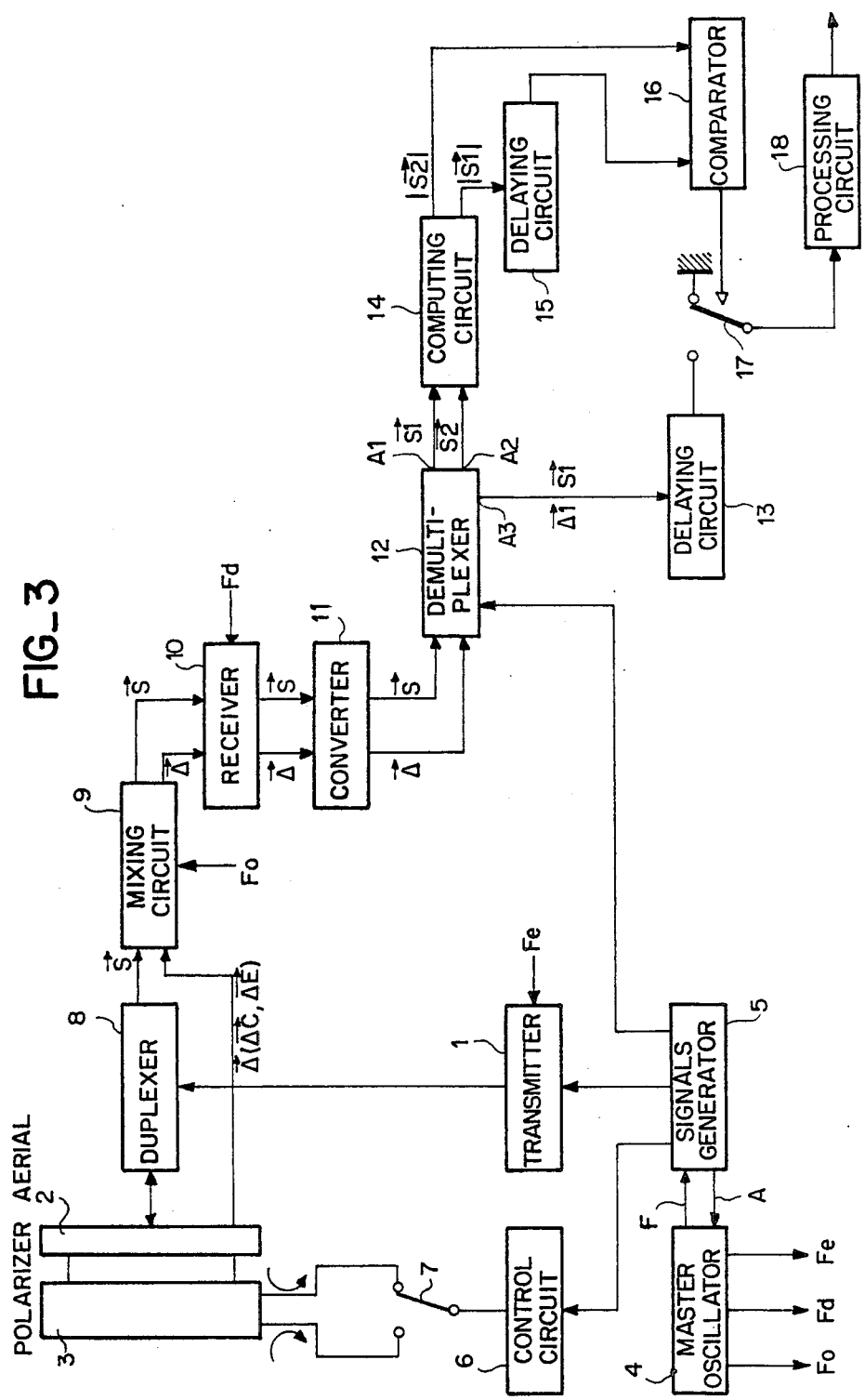

RADAR PROTECTED AGAINST RAIN CLUTTER AND METHOD FOR PROTECTING A RADAR AGAINST RAIN CLUTTER

BACKGROUND OF THE INVENTION

The present invention pertains to radars, and especially to the protection of radars against rain clutter, i.e. against parasitic echos from a simple reflection such as reflections on a plane or spherical surface.

In the prior art, this parasitic clutter is reduced by using radars in which the transmission and reception are done in circular polarization, with the same polarization direction used for transmission and reception. As compared with a radar working in rectilinear polarization, an attenuation of 15 to 20 dB is provided for these parasitic echos This attenuation is not always sufficient for it is indispensable to achieve greater rejection of echos of the rain clutter type. This is especially true for airborne radars which guide aircraft at minimum altitudes.

It is also known that with radar transmission in right-hand (or left-hand) circular polarization and with the same polarization at reception according to a first measurement, a useful echo from several reflections (ground or aircraft echo) is slightly attenuated and a parasitic echo (rain clutter) is attenuated by 15 to 20 dB by the polarizer. By contrast if, in a second measurement, all things being equal, the polarization at reception is reversed, the useful echo is slightly attenuated by about one decibel as compared with the first measurement, and the parasitic echo no longer undergoes the attenuation of 15 to 20 decibels It was on this basis that the European patent application of German origin No. 0 162 258 distinguishes rain clutter and therefore eliminates them by means of a transmitter/receiver aerial in right-hand circular polarization, for example, and by means of two ancillary receiving aerials, one in right hand circular polarization and the other in left-hand circular polarization. A comparison of the levels received makes it possible to distinguish between rain clutter This is an expensive device because it calls for two ancillary aerials. At best, the cost of this device can be reduced by using only one ancillary aerial.

SUMMARY OF THE INVENTION

The purpose of the present invention is to propose a radar which is effectively protected against rain clutter and which, furthermore, does not require the use of ancillary aerials for this purpose. This aim is achieved, especially, by means of transmission and reception on one and the same aerial in circular polarization and by the use of a switch-over polarizer for reception or for transmission.

According to the invention, there is provided a radar working in circular polarization, comprising: one polarizer associated with switching-over means to determine blocks comprising two successive recurrences with respectively identical and opposite polarizing directions at transmission and reception; a receiver to give video signals for each recurrence and, especially, sigma video signals; a demultiplexer coupled to the receiver, to demultiplex the video signals relating to either of the recurrences of one block; comparing means coupled to the demultiplexer to compare the sigma video signals of the two recurrences of one block; and a switch-over device coupled to the demultiplexer and controlled by the comparing means to eliminate, from among the video signals relating to one of the two recurrences of one block, those signals that the comparing means designate as relating to rain clutter.

According to the invention there is further provided a method for protecting a radar against rain clutter, a method in which the radar is made to operate by blocks of two successive recurrences having respectively identical and opposite directions of polarization at transmission and reception; a method wherein sigma and delta video signals are obtained; wherein the sigma video signals relating to the same values or quanta of distance in either one of the recurrences of a block are compared; wherein the video signals relative to one of the occurrences of a block are transmitted; wherein those signals designated by the results of the comparison as being rain clutter are eliminated from the sigma and delta signals transmitted, the criteria of elimination being that, for one and the same value of distance, the sigma video signal of the recurrence with identical polarization directions at transmission and reception has a smaller amplitude than the amplitude of the other sigma video signal with which it is compared

BRIEF DESCRIPTION OF THE DRAWINGS

The present invention will be better understood and other of its characteristics will appear from the following description and the appended figures, of which:

FIGS. 1 and 2 are time graphs pertaining to radars according to the invention.

FIG. 3 is the diagram of a radar which corresponds, depending on the way in which it is set, either to the graph of FIG. 1 or to the graph of FIG. 2.

MORE DETAILED DESCRIPTION

The radar which will be described herein, the transmission of which takes place in circular polarization with a constant direction (right-hand or left-hand) works in circular polarization as far as reception is concerned, but with a reversal of direction (right-hand or left-hand) at each recurrence. A recurrence is the time required for a transmission pulse and the following reception time. In other words, for a regularly occurring set of transmission pulses, the recurrence is the period (1/f) of the waveform. This makes it possible to identify the rain clutter by the signals of two successive recurrences: for a given value of distance, the echo will be considered to be a useful echo if it preserves the same level of about 1 decibel, and it will be considered to be a rain clutter if the difference in the level reaches 10 decibels or even exceeds it. This mode of operation is obtained by means of a switch-over polarizer (by using diode-operated switches).

In the example described, the radar transmission is done in the right-hand circular polarization mode with modification of the frequency transmitted at intervals of every 2 recurrences. FIG. 1 is a time graph pertaining to a first mode of operation of the radar described. In this figure, a curve A depicts the agility command of the frequency transmitted, with recurrences of a duration T and a transmission frequency Fi, Fj, Fk, etc. which varies at intervals of every two recurrences. Two successive recurrences at the same transmission frequency forms what is called here a recurrence block The radar reception is done on circular polarizations, the direction of which is reversed from one recurrence to the following one. The switching-over of the polarizer is done, as can be seen in the curve P of FIG. 1 which depicts the states of the polarizer (polarization at reception identical I or different D to that of transmission), alternately before and after the transmission impulse, so as to constantly preserve the same polarizing direction at transmission. These transmission impulses or, more exactly, these short transmission signals, are represented in the curve Ra of FIG. 1. The switching-over time, ta, before the transmitted impulse, reduces the maximum value of the distances which can be monitored with the radar, but this disadvantage is a minor one if the recurrence period T is long enough The switching-over time tp (with tp=ta), after the transmitted impulse, leads to the presence of a blind zone corresponding to very close distances. It is, therefore, worthwhile to have as short a switching-over time as possible for the polarizer. A switching-over time of about 1 microsecond, as in the example described, is relatively easy to obtain and causes the blind zone to be less of a problem than in most cases where a radar is used.

In the radar that we have just described, regardless of the polarizing direction at transmission and at reception, the useful echos, i.e. echos coming from multiple reflections, have equivalent levels at the input to the receiver. These echos are depicted in the curve Es of FIG. 1. By contrast, the rain clutter (parasite echos) from simple reflections have very different levels depending on whether the polarizing directions at transmission and reception are the same (state I of curve P) or are different (state D). This rain clutter is depicted by the curve Ep of FIG. 1. The curve Ep effectively shows that, for example, for one block of two recurrences during which the transmission frequency is Fi, of two impulses p1 and p2, relating to one and the same rain clutter, the impulse p2, relating to the recurrence during which the polarizing directions at transmission and reception are different, is appreciably greater than the impulse p1 relating to identical polarizing directions.

Thus, for each value of distance, a comparison of the levels received during two consecutive recurrences can be used to find the difference between the useful echos (curve Es) and the rain clutter (curve Ep). It must be noted that, in the example described, the comparison refers to blocks of two consecutive concurrences using the same transmission frequency. Although it is not indispensable that it should be so, the fact of using the same frequency to obtain echos for comparison makes it possible to:

Make a comparison in the same transmission conditions,

Diminish the number of agile frequencies needed by two.

In a block of two recurrences, the signals received during the first recurrence are used to filter and process all the video signals (sigma channels S and delta channels $\Delta C$ and $\Delta E$ while the signals received during the second recurrence are used only to obtain the sigma video signals to be compared with those of the preceding recurrence to identify and eliminate the rain clutter received during the first recurrence (pulses p1 according to the curve Ep of FIG. 1). In FIG. 1, the processed signals St are indicated as follows: sigma signals, S1, and delta signals, $\Delta 1$, during the first recurrence and sigma signals S2 during the second recurrence.

It must be noted that when the field of distances to be taken into account by the radar is relatively small, for example, it is about 5 to 10 miles (about 9 to 18 km.), high recurrence frequencies of about 5 to 15 kHz can be used. However, two observations must be made to determine the recurrence frequency:

The field of the distances in which a processing operation must be made to eliminate rain clutter is only a fraction of the entire field of distances of the radar. Thus, for example, it is generally enough for this processing operation to be used only for the first miles of the field of the distances. In the example described, which pertains to an airborne radar, used especially to provide for the safety of very low-altitude navigation, this distance is about 5 nautical miles. Beyond this distance, the attenuation given to rain clutter by circular polarization is, in most applications, adequate to prevent these echos from causing problems.

Since the transmission frequency is the same during both recurrences of one and the same block, there is the risk that echos of the second scanning will be received, namely, that echos from a transmission relating to the first recurrence will be received during the second recurrence and, therefore, there will be a risk that erroneous signals will be taken into account.

In the light of the above two observations, it was possible to improve the radar that has just been described with reference to FIG. 1: this improvement has given the radar depicted by the time graph of FIG. 2.

The improvement lies in the use of different time periods for both recurrences of one and the same block of two recurrences: the duration T1 of the first recurrence, relating to the computation and processing of delta measurements $\Delta$ (circular $\Delta C$ and elevation $\Delta E$ delta measurements) is increased to the detriment of the duration T2 of the second recurrence which is reduced to the strictly necessary level.

FIG. 2 depicts two curves Rb and A which respectively depict the transmission impulses of the radar and the agility control A of the frequency transmitted. The two-recurrence blocks with one and the same transmission frequency contain the first recurrence with a duration T1=437.5 microseconds and the second recurrence with a duration T2=62.5 microseconds smaller than the duration T1, giving a total of 500 microseconds per block. The duration T1 is sub-divided into two zones: a zone with a duration Tu=125 microseconds constituting a zone of use of the radar and corresponding to the field under investigation going up to 10 nautical miles, i.e. about 18 km., followed by a zone with a duration of Tn=312.5 microseconds constituting a neutralized zone. The zone with a duration Tn is intended to provide a boosted attenuation to echos coming from a transmission relating to the first recurrence of the block and received during the second recurrence (second scanning echos). As regards this second recurrence, its duration T2, of 62.5 microseconds, corresponds to a field of distances of 5 miles, in relation to the first of the two observations made above: with reference to the example depicted in FIG. 1, an additional attenuation of about 8 decibels is obtained with second scanning echos.

In FIG. 2, the processed signals are indicated as follows: sigma signals S1, and delta signals 1, during the zone of the duration Tu, and sigma signals, S2 during the second recurrence.

FIG. 3 is a diagram of the radar in question during the description of FIGS. 1 and 2. An operation according to FIG. 1 or according to FIG. 2 is characterized by the duration of the recurrences and hence, the duration of the signals but does not bring out any differences in the FIG. 3.

In this diagram, the precise synchronizing device, which comes under the prior art, is not depicted in order to make the drawing clearer and in order to simplify the explanation.

FIG. 3 depicts a transmitter 1 of a radar connected to an aerial 2 by a duplexer 8. A mixing circuit 9 receives the sigma signals S from the duplexer 8 and the delta signals Δ from the aerial. It transmits these signals, after mixing with the frequency Fo given by a driving oscillator 4, to an intermediate frequency receiver 10. The output stage of the receiver 10 gives the signals Δ and S in video frequency by demodulation by means of a frequency Fd given by the oscillator 4.

In addition to the frequencies Fo and Fd, the master oscillator 4 gives a signal F with a frequency of 20 megahertz. The signal F is delivered to a signals generator 5 comprising a counter circuit of the periods of the signal F, followed by a decoding circuit to define:

The operating time of the transmitter (signal R, corresponding to the curves RA, Rb of the FIGS. 1 and 2.), The moments at which the frequency Fe of the transmitter has to be modified (agility signal in frequencies depicted by the curve A of FIGS. 1 and 2, determining the transmission by the oscillator 4 of a frequency Fe which varies randomly values Fi, Fj, Fk, etc. of FIG. 1, values Fi, Fj, etc. of FIG. 2).

The moments at which a control circuit 6 must control the tripping of an electronic switch 7, with 2 positions in order to modify the direction of the polarization of the set comprising the aerial 2 and a polarizer 3 linked to the aerial: this tripping takes place alternately before and after a transmission impulse as was explained in the description of the curve P of FIG. 1. It must be noted that these tripping moments are defined in the same way (after and before the transmission impulses) as in the case of the blocks of two recurrences of unequal durations;

The tripping moments of a demultiplexer 12 which receives the sigma signals S and the delta signals Δ from the receiver 10, through an analog/digital converter 11: the input of the sigma signals S of the demultiplexer 11 is linked to its first output A1, after the starting impulse of the first recurrence of a block and until the beginning of the following transmission impulse (in the example of the entirely identical recurrences described by means of FIG. 1) or until the end of the useful zone with a duration Tu (FIG. 2: example of recurrences of unequal durations). The input of the sigma signals S of the demultiplexer is linked to its second output A2 after the starting impulse of the second recurrence of a block and until before the first recurrence of the following blocks, corresponding in FIG. 1 to the part D of the curve P located between two hatched zones, during which the polarization at reception is different from the polarization at transmission.

The demultiplexer 12 comprises a third output A3 which is connected to its delta and sigma inputs after the starting impulse of the first recurrence of a block and until the beginning of the following transmission impulse (in the example of the wholly identical recurrences described with reference to FIG. 1) or until the end of the useful zone (FIG. 2: example of recurrences of unequal durations).

The outputs A1 and A2 of the demultiplexer 12 are linked to a computing circuit 14 which computes the $|S1|$ and $|S2|$ modules relating to the sigma signals S1 and S2 during the first and second recurrences. The modules $|S1|$ and $|S2|$ relating to the same values of distance of two recurrences of one and the same block are compared by means of a set comprising a delay circuit 15 which delays S1 and an amplitude comparator 16 which compares the signal S2 given directly by the computing circuit 14 with the signal S1 given by the delaying circuit.

A delaying circuit 13 has an input connected to the output A3 of the demultiplexer 12 to receive the signals Δ1 and S1 relating to the first recurrence of a block. The delay of the circuit 13 is equal to the delay of the circuit 15 plus the delay contributed by the computing circuit 14.

An electronic switch 17, controlled by the comparator 16, receives, at a first terminal, the signals Δ1 and S1 coming from the delaying circuit 13, and it has a second terminal which is linked to the ground. If the result of the comparison made by the comparator 16 is $|S1| > |S2|$, the comparator permits the transmission of the signals Δ1, S1. In the opposite case, which corresponds to the detection of a parasite echo, the switch 17 leaves the output of this delaying circuit 13 idle. Thus, a processing circuit 18 linked to the common terminal of the switch 127 receives only signals Δ1 and S1, identified by the comparator 16 as being relative to the ueful echos.

The present invention is not limited to the examples described. Thus, for example, especially in the example of the FIG. 1, and insofar as the values relating to close distances are not exploited, the first recurrence of the block could have been done with different circular polarization directions at transmission and reception and the second recurrence could have been done with the same direction since the parasite signals produced by the rain clutter are eliminated.

Similarly, in a block of two recurrences, the first recurrence may be used to correct the second recurrence and the second recurrence may be used for the computing and processing of the delta measurements. In this case, the switching-over of the switch 7 should no longer be done before the transmission impulse relating to the first recurrence of a block and after the impulse relating to the second recurrence but after the impulse of the first recurrence and before the impulse of the second recurrence.

With recurrences of identical durations, it is also possible to transmit the signals relating to each of the recurrences to the signals processing circuits by eliminating the spurious signals, again through a comparison between the sigma channel modules of the distance values of both recurrences of one and the same block. This makes it possible to use useful signals, relating to both recurrences in the processing circuit.

What is claimed is:

1. Radar working in circular polarization by emission of successive transmission impulses, comprising: one polarizer associated with switching-over means to determine blocks comprising two successive recurrences with one recurrence having identical polarizing directions at transmission and reception, and the other recurrence having opposite polarizing directions at transmission and reception, a recurrence being an interval between the times of the corresponding features of two consecutive transmission impulses; a receiver to give video signals for each recurrence and, especially, sigma video signals; a demultiplexer coupled to the receiver, to demultiplex the video signals relating to either of the recurrences of one block; comparing means coupled to the demultiplexer to compare the sigma video signals of the two recurrences of one block; and a switch-over device coupled to the demultiplexer and controlled by the comparing means to eliminate, from among the video signals related to one of the two recurrence of one block, those signals that the comparing means designate as relating to rain clutter.

2. Method for protecting a radar against rain clutter, wherein the radar is made to operate by blocks of two successive recurrences, one recurrence having identical directions of polarization at transmission and reception and the other recurrence having opposite directions of polarization at transmission and reception; a method wherein sigma video signals are obtained; wherein the sigma video signals relating to the same distance values in either one of the recurrences of a block are compared; wherein the video signals relative to one of the occurrences of a block are transmitted; wherein those signals designated by the results of the comparison as being rain clutter are eliminated form the sigma signals transmitted, the criteria of the elimination being that for one and the same value of distance, the sigma video signals of the recurrence with identical polarization directions at transmission and reception has a smaller amplitude than the amplitude of the other sigma video signal with which it is compared.

3. Method according to claim 2, wherein both recurrences of one and the same block have the same duration.

4. Method according to claim 2, wherein both recurrences of one and the same block have different durations, one recurrence being the longest recurrence and one recurrence being the shortest recurrence, and wherein the signals transmitted are the sigma and delta signals relating to the longest recurrence of one block.

5. Method according to claim 4 wherein, for one block, the video signals transmitted are those relating to the time period beginning at the start of the longest recurrence, this period having a duration which is between the duration of the longest recurrence and the duration of the shortest recurrence.

* * * * *